Dec. 22, 1970  F. D. McLEOD, JR  3,550,070

FLUID FLOWMETER

Filed June 28, 1968

INVENTOR
FRANCIS D. McLEOD, JR.

Stowell & Stowell

ATTORNEYS

United States Patent Office 3,550,070
Patented Dec. 22, 1970

3,550,070
FLUID FLOWMETER
Francis D. McLeod, Jr., Ithaca, N.Y., assignor, by mesne assignments, to Research Corporation, New York, N.Y., a non-profit corporation of New York
Filed June 28, 1968, Ser. No. 741,187
Int. Cl. G01s 9/66
U.S. Cl. 340—3                                    5 Claims

ABSTRACT OF THE DISCLOSURE

A flowmeter wherein carrier waves are transmitted to blood carrying tissues. Reflected waves contain both carrier and Doppler components. The reflected wave is split, and waves differing from the carrier by a fixed (both plus and minus) phase are added to each part, the sum then being detected (rectified) in each case. A zero crossing technique, utilizing Schmidt triggers, multivibrators, and gates, yields information both as to the magnitude and direction of the Doppler shift.

---

Figure 1:
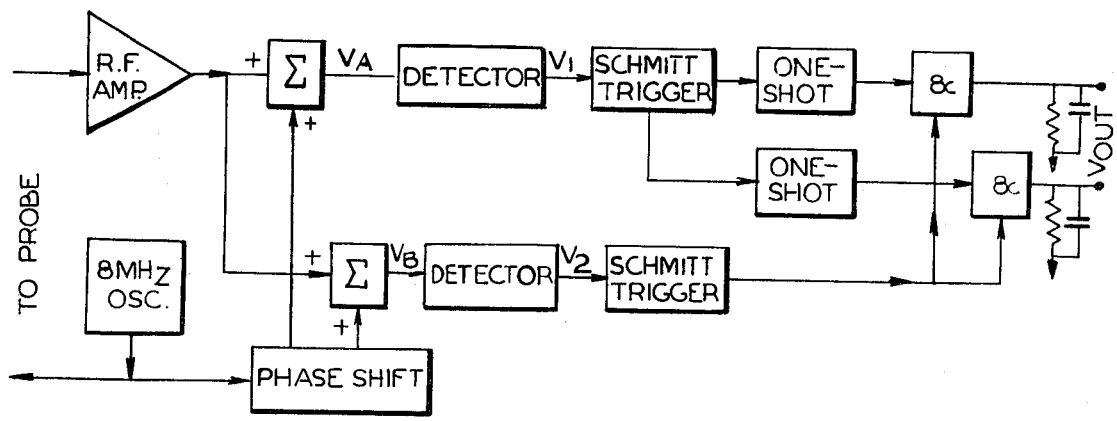

The invention described herein was made in the course of, or under, a grant from the U.S. Public Health Service, Department of Health, Education, and Welfare. This invention relates to a flowmeter for measuring the velocity and direction of fluid flow in passageways. The invention exhibits especial utility in the measurement of blood flow in living tissues, such as the human heart.

The prior art is aware of a variety of flowmeters, including those which employ the Doppler effect. This effect, named after an Austrian physicist of the last century, is the change in apparent frequency as an observer moves towards or away from a source of vibrations. As the observer and source move towards each other the apparent frequency increases, the increase being proportioned to the speed at which the source and observer move. Similarly, a decrease in apparent frequency is noted when the source and observer move away from each other, the decrease being a function of the speed of the source and observer.

In the case of a fluid stream which carries in it particles (i.e., reflecting masses), the velocity of the stream may be determined by employing this effect. Pulses of a fixed frequency are transmitted to the stream and reflections from the particles occur. The apparent change in frequency, received and analyzed by suitable apparatus, is thus a measure of the stream's velocity. Due at least in part to the detection (demodulation) devices employed in the past, it is often not possible to know whether the observed frequency change represents an addition to or a substraction from the fixed or carrier frequency. For example, a particular Doppler effect flowmeter may indicate a change in frequency, but not indicate whether an increase or a decrease obtains. While the positioning of several parts of the apparatus will often make the algebraic sign of the frequency change apparent, there arise occasions in physiology where the direction of flow is not readily apparent.

Tissue layers and blood cells provide sufficient interface to scatter and reflect high-frequency sound waves. The frequency of waves reflected from a stationary interface is the same as that of the incident wave, however, waves scattered from a moving particle experience a Doppler shift proportional to the velocity of the scatterer.

Generally the reflected wave consists of a large carrier component and a much smaller Doppler component. The technique presently used in Doppler flowmeters is the heterodyne the carrier and Doppler components. The two signals are combined in a diode, or some other nonlinear device, and the difference or Doppler frequency is selected by a low-pass filter. Since the difference frequency is unsigned one cannot tell from the output if the Doppler component was shifted above or below the carrier. Thus, it is impossible to distinguish between forward and reverse flow. When the flow or motion is always in the same direction this ambiguity is of little or no concern, however, many physiological problems do not fall into this class. Detailed studies of pulse shape or quantitative measurement of mean flow require the identification of forward and reverse motion.

According to the practice of this invention, an analyzing method and apparatus is provided for determining the amount and direction of Doppler shifts in a Doppler type flowmeter.

Figure 2:
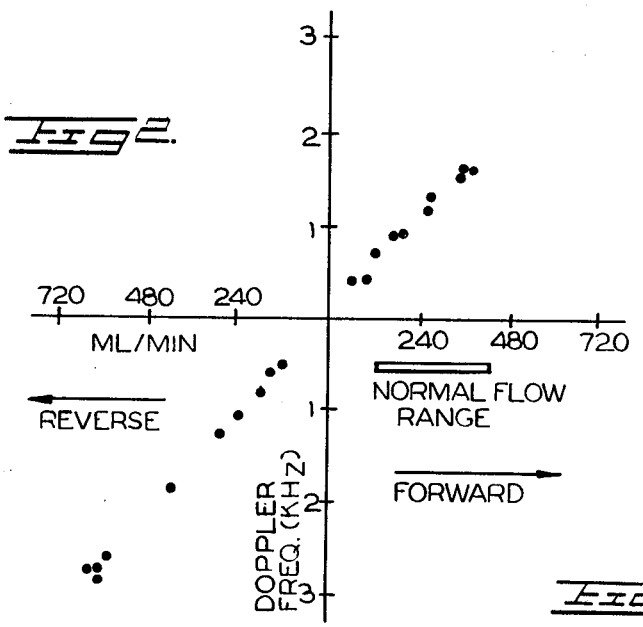
Figure 4:
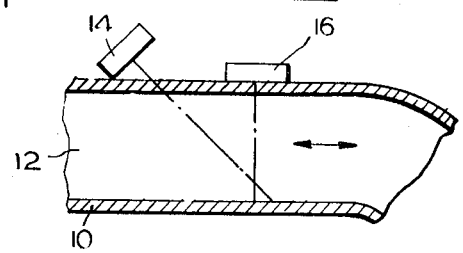
Figure 3:
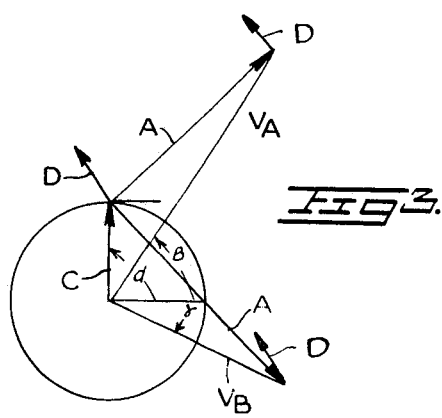

In the drawings:
FIG. 1 is a block diagram of the apparatus of the invention.
FIG. 2 is a chart showing, for a typical living tissue, the relationship between Doppler frequency and directional blood flow, for a carrier frequency of 7.8 mHz.
FIG. 3 is a phasor diagram, illustrating certain combinations of voltages in the apparatus of FIG. 1.
FIG. 4 is a schematic view showing probes secured adjacent an in vivo tissue through which blood flows.

Referring to FIG. 1, a probe such as described by Franklin et al. Amer. J. Med. Elect., 5: (1), 24–28, (1966) was employed to feed the R.F. amplifier. The input to the R.F. amplifier, i.e., the received signal, may be expressed in the form:

(1)  $V_{\text{in}} = C \cos(w_c t + \text{alpha}) + D \cos(w_c t + w_d t)$ where C and D represent the magnitudes of the carrier and Doppler components. Representative values for C are 1–100 while D is only 5–50 microvolts. The term $w_d$ represents the difference between the frequency of the reflected wave from a moving particle and the frequency $w_c$ of the carrier wave. In this development, $w_d$ may be considered plus or minus, depending on whether the reflected frequency is greater or less than the carrier. The angle alpha represents the nominally fixed delay of the carrier wave reflected from the vessel wall, subject to occasional motion of the blood vessel wall or electrical leakage between the exciting and detecting transducer elements. Signals of the form $$A \cos\left(w_c t + \frac{\pi}{4}\right)$$

and $$A \cos\left(w_c t - \frac{\pi}{4}\right)$$

from the phase shift network are added to the upper and lower lines, as indicated by the boxes denoted by sigma. Each addition is made to the $V_{\text{in}}$ wave after it has been split. The maximum amplitude A of the added waves is selected to be greater than approximately 2C. The input to the upper square-law detector is of the form:

(2)
$$V_A = A \cos\left(w_c t + \frac{\pi}{4}\right) + C \cos(w_c t + \text{alpha}) + D \cos(w_c t + w_d t)$$

Bearing in mind the phasor diagram of FIG. 3, this may be written in the form:

(3)  $V_A = F \cos(w_c t + \text{beta}) + D \cos(w_c t + w_d t)$

Similarly, the input to the lower square-law detector is of the form:

(4)  $V_B = G \cos(w_c t - \text{gamma}) + D \cos(w_c t + w_d t)$

The detectors effectively square the inputs to yield outputs from which the difference frequency $w_d$ is selected and retained.

(5)     $V_1 = FD \cos(w_d t - \text{beta})$ for $w_d > 0$ (6)     $= FD \cos(w_d t + \text{beta})$   $w_d < 0$ and (7)     $V_2 = GD \cos(w_d t + \text{gamma})$   $w_d > 0$ (8)     $= GD \cos(w_d t - \text{gamma})$   $w_d < 0$ The phase difference, delta, between $V_1$ and $V_2$ is $-(\text{beta}+\text{gamma})$ for $w_d > 0$ and $(\text{beta}+\text{gamma})$ for $w_d < 0$. Thus, the sign of delta is the sign of $-w_d$. Typical values of delta are in the range of 60 to 120 degrees.

The detector outputs $V_1$ and $V_2$ enter Schmidt triggers as illustrated, the upper of which has two alternately on/off switches (i.e., transistors, etc.) feeding, alternately, one-shot multivibrators. The AND gates alternately conduct, one indicating forward blood flow and the other flow in the opposite direction. This in turn energizes conventional RC integrators to yield a magnitude proportional to blood velocity. The latter three block elements of FIG. 1 define a zero-crossing apparatus, with each Schmidt firing at a frequency proportional to the Doppler frequency. The precise circuitry of the boxes of FIG. 1 is not illustrated, as it is well known to workers in this art.

In a typical environment such as that defining the data represented in FIG. 2, a carrier frequency of 7.8 mHz. was used, Doppler shifts produced by flow velocities of $5 \times 10^{-3}$ m./sec. to 1 m./sec. were measured. Because the magnitude of delta is independent of $w_d$, the system is free of drift.

FIG. 3 illustrates the carrier voltage C at the phase angle alpha, to which is vectorially added the (rotating) Doppler component D. The two plus and minus 45 degree injection voltages A, when added to $C+D$, yield the indicated out-of-phase resultants.

FIG. 4 indicates one mode of feeding the carrier to an in vivo tissue and of obtaining reflected signals. Here the numeral 10 denotes the wall of a tissue which carries a stream of blood 12. Transducer probes 14 and 16, secured respectively to the oscillator and the R.F. amplifier, are positioned adjacent the tissue. If desired, the earlier-mentioned probe employed by Franklin et al. may be used.

I claim:

1. A Doppler effect flowmeter for determining the velocity and direction of in vivo blood flows by Doppler effect in a living organism comprising, means for transmitting waves of a carrier frequency into the blood carrying tissue of the living organism, means for receiving waves reflected from a tissue of the living organism and from the blood therein, means for splitting the received waves into first and second signals, a first and a second channel for receiving respectively, said first and said second signals, each channel including means for adding to each of said first and said second signals a signal component differing from the carrier frequency by a fixed phase so as to shift the phase of said first signal relative to the phase of said second signal, a detector connected to receive the phase shifted signal and a trigger stage connected to the output of the detector, the trigger stage of one channel having two outputs, alternating in timed relationship, the trigger stage of the other channel having a single output, said one channel having a first and a second one-shot multivibrator and a first and a second AND gate, each AND gate having two inputs and an output, means for operatively connecting each multivibrator to one of the outputs of the trigger stage in said one channel, means for separately connecting one input of the first and the second AND gates to the outputs of said first and second multivibrators, means for connecting the other input of said first and second AND gates to the output of the trigger stage of the other channel whereby conduction of one AND gate indicates blood flow in one direction and conduction of the other AND gate indicates blood flow in the opposite direction and each channel further including an integrator connected to the output of the corresponding AND gate to provide an output signal proportional to the blood velocity.

2. A flowmeter as set forth in claim 1 wherein said integrator is an RC circuit.

3. A flowmeter as set forth in claim 1 wherein said signal added to said first and second signals has an amplitude of approximately twice the magnitude of the carrier.

4. A flowmeter as set forth in claim 1 wherein the relative phase difference between the signals added to said first and said second signals is 90°.

5. A method of determining the velocity and direction of in vivo blood flow of a living organism by the Doppler effect including the steps of:
(a) transmitting waves of an ultrasonic carrier frequency into blood carrying tissues;
(b) receiving waves which are reflected from the blood therein, such waves containing components of both carrier and Doppler frequencies;
(c) splitting the received reflected waves into first and second waves;
(d) producing two waves of the carrier frequency differing from each other in phase by 90°;
(e) adding one of said two waves to one of the split reflected waves and adding the other wave to the other split reflected wave, the amplitude of at least one added wave being greater than twice the amplitude of the carrier component of the reflected waves;
(f) applying the signal derived from each detected phase shifted wave to an associated Schmidt trigger;
(g) feeding the output of one Schmidt trigger alternately to a first and a second multi-vibrator;
(h) applying the outputs of said first and said second multi-vibrator, together with the output of the other Schmidt trigger, to a first and a second AND gate, respectively, to develop from said first AND gate a first signal indicative of blood flow in one direction and from said second AND gate a second signal indicative of blood flow in the opposite direction; and
(i) integrating each of said first and said second signals to thereby provide a potential the magnitude of which is proportional to blood velocity.

References Cited

UNITED STATES PATENTS

| | | | |
|---|---|---|---|
| 2,982,942 | 5/1961 | White | 340—6X |
| 3,295,127 | 12/1966 | Kross | 343—8X |
| 3,402,604 | 9/1968 | Kahn et al. | 73—194 |

OTHER REFERENCES

Smyth, Ultrasonics, January 1966, p. 21.

Skolnik, Radar Systems, McGraw-Hill (1962), pp. 82, 83 and 84.

Farrall, "Design Considerations for Ultrasonic Flowmeters," IRE Trans. on Med. Elec., December 1959, pp. 198, 199, 200, and 201.

RICHARD A. FARLEY, Primary Examiner

U.S. Cl. X.R.

73—194; 343—8